Nov. 11, 1930.     J. L. BROWNELL     1,781,099
MOTOR VEHICLE CONTROL APPARATUS
Filed Oct. 5, 1929
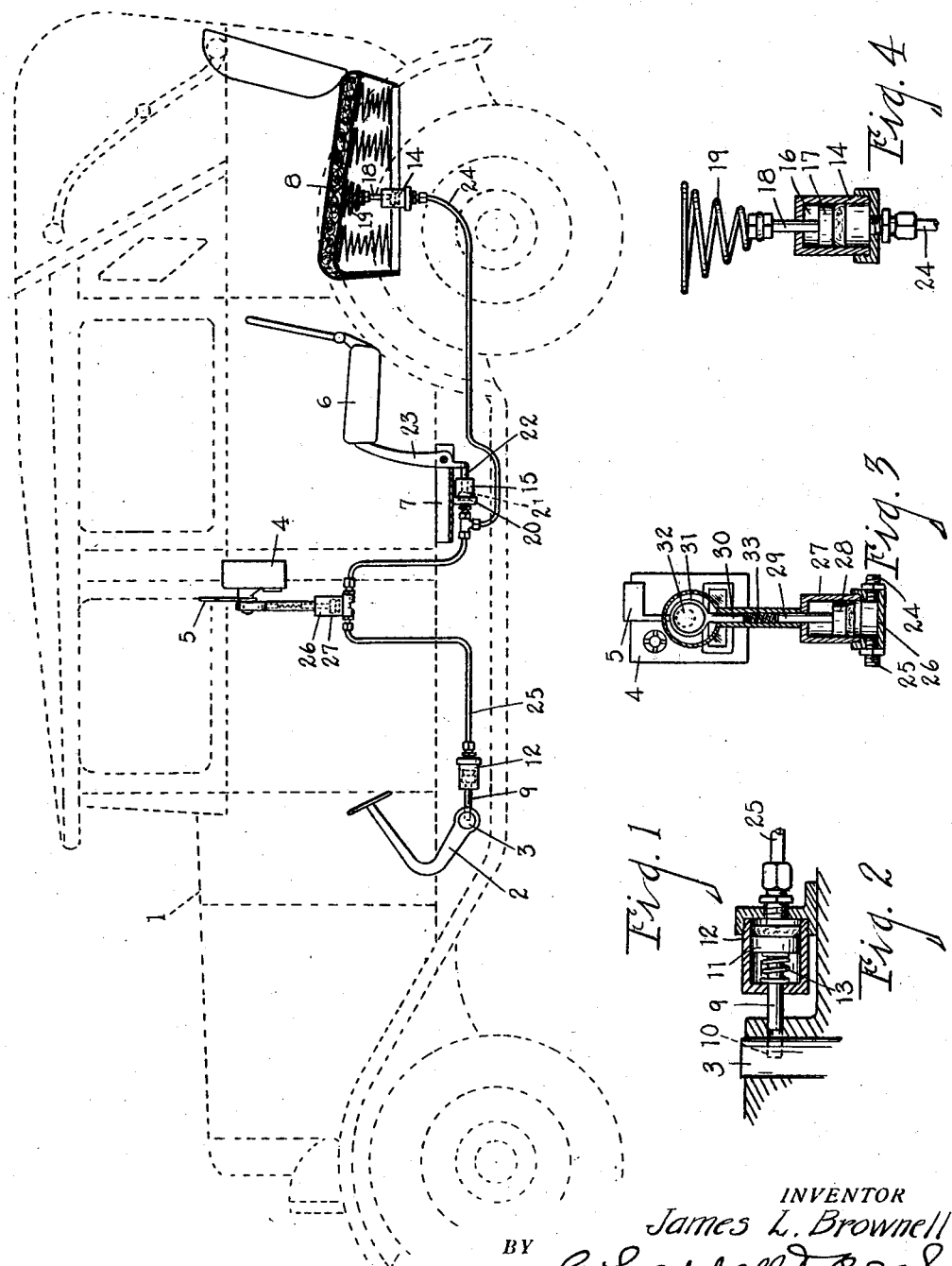
INVENTOR
James L. Brownell
BY Chappell & Earl
ATTORNEYS Patented Nov. 11, 1930

1,781,099

UNITED STATES PATENT OFFICE

JAMES L. BROWNELL, OF KALAMAZOO, MICHIGAN, ASSIGNOR TO CHECKER CAB MANUFACTURING CORPORATION, OF KALAMAZOO, MICHIGAN

MOTOR-VEHICLE-CONTROL APPARATUS

Application filed October 5, 1929. Serial No. 397,722.

It is not unusual for owners of taxicabs to suffer very material losses on account of manipulation of the meters by dishonest drivers, that is, operating them so that they fail to record and failing to turn in the unrecorded amounts.

It is the main object of this invention to provide an apparatus which will prevent the operation of the vehicle unless the meter is placed in action.

A further object is to provide an apparatus of this character in which the passenger operates a locking means which can only be released by the placing of the meter into operative condition.

A still further object is to provide an apparatus of this character which is entirely concealed so far as the passenger is concerned.

Objects pertaining to details and economies of my invention will definitely appear from the description to follow. The invention is defined in the claims.

A structure which embodies the features of my invention is clearly illustrated in the accompanying drawing in which:

Fig. 1 is a side elevation of a motor vehicle, the vehicle proper being shown mainly by dotted lines with my improved control apparatus incorporated therein and shown by full lines. The parts of the vehicle directly associated with the apparatus are shown in full lines and other parts conventionally.

Fig. 2 is an enlarged detail view partially in section of the vehicle control element and the locking means therefor.

Fig. 3 is a fragmentary view partially in vertical section illustrating the parts directly associated with the control element of the meter.

Fig. 4 is a fragmentary view partially in section illustrating details of the actuating unit associated with one of the seats of the vehicle.

Referring to the drawing, the vehicle 1 is shown by dotted lines in order to better illustrate the relation of my control apparatus thereto. 2 is the foot clutch lever or pedal and 3 its shaft which is operatively connected to the clutch, the connections not being illustrated.

The meter shown conventionally at 4 is provided with a combined signal and control element 5

6 is a collapsible seat adapted to be folded and collapsed into the recess 7 provided in the floor of the vehicle. 8 is the spring cushion for the rear seat.

The vehicle control element, in this instance the pedal and its shaft, is provided with a locking pin 9 which is adapted to enter a radial hole 10 in the shaft, the hole being in position to receive the pin when the clutch is in neutral position. The locking pin 9 is carried by the plunger 11 arranged in a cylinder 12 and a return spring 13 is provided for the plunger. This constitutes the actuated unit of the apparatus in the embodiment illustrated.

I provide two actuating units designated generally by the numerals 14 and 15 in this embodiment illustrated, one associated with the seat cushion 8 and the other with the collapsible seat 6. The actuating unit 14 comprises a cylinder 16 and a plunger 17 having a stem 18 connected to the lower end of the spring 19 which is interposed in the spring cushion 8 so that the occupant of the seat will actuate the plunger.

The actuating unit 15 comprises a similar cylinder 20 and a plunger 21, indicated by dotted lines in Fig. 1, having a stem 22 projecting to be engaged by the lower end of the standard 23 of the collapsible seat 6 so that when the seat is erected this plunger is advanced in the cylinder. Both of these actuating unit cylinders are connected by the pipes 24 and 25 to the actuated cylinder.

Interposed in this connection is a control unit operatively associated with the meter. This control unit designated generally by the numeral 26 comprises a cylinder 27, one end of which is open to the connection for the actuating unit cylinders to the actuated unit cylinder, see Figs. 1 and 3. The plunger 28 is provided with a stem 29 disposed in alinement with a stem 30 on the cam or eccentric strap 31 which coacts with a cam or eccentric 32 on the meter control element 5.

A coiled spring 33 is interposed between the stems 29 and 30, the purpose of which is to prevent undue stress on the parts. The tension of the spring, however, is sufficient to hold the plunger 28 against the pressure of the system.

In the accompanying drawing the parts are shown with the plunger 28 in its actuated position, the meter control member being in non-registering position, which is the position it is supposed to occupy when the vehicle is unoccupied. With the parts in this position the erection of the seat 6 or the occupancy of the seat cushion 8 will actuate the actuating units associated therewith, forcing the fluid through the conduits to actuate the locking pin so the vehicle cannot be started until this locking pin is released, as is the case when the meter control member is swung downward to registering position. This releases the plunger 28 so that the spring 13 may withdraw the locking pin. The cylinder 27 is in effect a relief or pressure relief chamber.

I have not in the accompanying drawing attempted to maintain a relative proportion of the parts. Neither have I attempted to illustrate and describe therein other adaptations of my improvements. For instance, instead of controlling the clutch lever the actuated unit of the system might be connected to the ignition control, throttle control or the like.

It is believed, however, that this disclosure will enable those skilled in the art to which my invention relates to embody or adapt the same as may be desired.

Having thus described my invention, what I claim as new and desire to secure by Letters Patent, is:

1. The combination in a motor vehicle including a movable control elment, a meter provided with a movable control element, a seat provided with a spring cushion, and a collapsible seat, of an actuated unit comprising a cylinder provided with a plunger and a return spring therefor, a locking pin carried by said plunger coacting with said control element for locking it in operative position, actuating units comprising cylinders provided with plungers, the plunger of one cylinder being operatively associated with said spring seat cushion and the other with said collapsible seat, a hydraulic connection for said actuating unit cylinders to said actuated unit cylinder, a control unit cylinder interposed in said connection between said actuating unit and actuated unit cylinders and provided with a plunger, and operating connections for said control unit cylinder plunger and said signal element of said meter.

2. The combination in a motor vehicle including a movable control element, a meter provided with a movable control element, and a seat provided with a spring cushion, of an actuated unit comprising a cylinder provided with a plunger and a return spring therefor, a locking pin carried by said plunger coacting with said control element for locking it in operative position, an actuating unit comprising a cylinder provided with a plunger operatively associated with said spring seat cushion, a hydraulic connection for said actuating unit cylinder to said actuated unit cylinder, a relief unit cylinder interposed in said connection between said actuating unit and actuated unit cylinders and provided with a plunger, and operating connections for said control unit cylinder plunger and said signal element of said meter.

3. The combination in a motor vehicle including a movable control element, a meter provided with a movable control element, and a collapsible seat, of an actuated unit comprising a cylinder provided with a plunger and a return spring therefor, a locking pin carried by said plunger coacting with said control element for locking it in operative position, an actuating unit comprising a cylinder provided with a plunger operatively associated with said collapsible seat, a hydraulic connection for said actuating unit cylinder to said actuated unit cylinder, a relief unit cylinder interposed in said connection between said actuating unit and actuated unit cylinders and provided with a plunger, and operating connections for said control unit cylinder plunger and said signal element of said meter.

4. The combination in a motor vehicle including a control element, and a meter provided with a control element, of an actuated unit provided with a plunger operatively associated with said vehicle control element, an actuating unit comprising a cylinder and a plunger operatively associated with a seat of the vehicle to be automatically actuated by the occupancy of the seat, a fluid connection for said actuating unit cylinder to said actuated unit cylinder, a pressure relief unit cylinder interposed in said connection between said actuated and actuating unit cylinders provided with a plunger, and operating connections for said pressure relief cylinder plunger to the control element of said meter.

5. The combination in a motor vehicle including a control element, a meter provided with a control element, an actuated unit provided with a plunger operatively associated with said vehicle control element, an actuating unit comprising a cylinder and a plunger automatically actuated by a passenger, a fluid connection for said actuating unit cylinder to said actuated unit cylinder, a pressure relief unit cylinder interposed in said connection between said actuated and actuating unit cylinders provided with a plunger, and operating connections for said pressure relief cylinder plunger to the control element of said meter.

6. The combination in a motor vehicle provided with an operation control element, and a meter for the vehicle provided with a registering control element, of a seat for said vehicle provided with a spring cushion, a fluid actuated unit operatively associated with said vehicle control element, a fluid actuating element operatively associated with said spring cushion to be actuated by the occupancy of the seat, a fluid connection for said actuating and actuated units, and a pressure relief unit interposed in said connection and operatively connected to said meter control element.

7. The combination in a motor vehicle provided with an operation control element, and a meter for the vehicle provided with a registering control element, of a fluid actuated unit operatively associated with said vehicle control element, a passenger actuated fluid actuating element, a fluid connection for said actuating and actuated units, and a pressure relief unit interposed in said connection and operatively connected to said meter control element.

In witness whereof I have hereunto set my hand.

JAMES L. BROWNELL.